US012784386B2

(12) United States Patent
Hausler et al.

(10) Patent No.: US 12,784,386 B2
(45) Date of Patent: Nov. 3, 2026

(54) THREE-DIMENSIONAL THREAT IMAGE PROJECTION AND IMAGE AUGMENTATION

(71) Applicant: Battelle Memorial Institute, Columbus, OH (US)

(72) Inventors: Michael Ryan Hausler, Egg Harbor Township, NJ (US); Brett Brillhart, Voorhees, NJ (US); Allen Kwame Anderson, San Antonio, TX (US); Mitchell Kobil, Philadelphia, PA (US)

(73) Assignee: Battelle Memorial Institute, Columbus, OH (US)

( * ) Notice: Subject to any disclaimer, the term of this patent is extended or adjusted under 35 U.S.C. 154(b) by 110 days.

(21) Appl. No.: 18/884,416

(22) Filed: Sep. 13, 2024

(65) Prior Publication Data

US 2025/0104373 A1 Mar. 27, 2025

Related U.S. Application Data

(60) Provisional application No. 63/584,221, filed on Sep. 21, 2023.

(51) Int. Cl.
*G06T 19/20* (2011.01)
*G06Q 50/26* (2024.01)
(Continued)

(52) U.S. Cl.
CPC ........... *G06T 19/20* (2013.01); *G06Q 50/265* (2013.01); *G06T 7/11* (2017.01); *G06T 7/136* (2017.01);
(Continued)

(58) Field of Classification Search
CPC ......... G06Q 50/265; G06T 7/11; G06T 7/136; G06T 7/194; G06T 19/20;
(Continued)

(56) References Cited

U.S. PATENT DOCUMENTS 10,096,122 B1 * 10/2018 Agrawal .................. G06T 7/90
2010/0266204 A1 * 10/2010 Ivakhnenko ............ G06T 11/00 382/173
(Continued)

OTHER PUBLICATIONS

International Search Report and Written Opinion from corresponding PCT Appln. No. PCT/US 24/46568, dated Dec. 2, 2024. 11 pages.

*Primary Examiner* — Cory A Almeida
(74) *Attorney, Agent, or Firm* — Secant IP, PLLC; Donald G. Weiss

(57) ABSTRACT

In an approach to three-dimensional object image projection and image augmentation, a system includes one or more computer processors; one or more graphics processing units; one or more computer readable storage media; and program instructions stored on the one or more computer readable storage media for execution by at least one of the one or more computer processors or at least one of the one or more graphics processing units. The stored program instructions include instructions to: retrieve an object image; retrieve a background image; determine one or more voids in the background image suitable for inserting the object image; manipulate the object image to fit into the background image; insert the object image into the background image to create a projected image; and perform the image augmentation on the projected image to produce a realistic synthetic image.

20 Claims, 8 Drawing Sheets

(51) Int. Cl.
*G06T 7/11* (2017.01)
*G06T 7/136* (2017.01)
*G06T 7/194* (2017.01)

(52) U.S. Cl.
CPC .... *G06T 7/194* (2017.01); *G06T 2207/10081* (2013.01); *G06T 2210/22* (2013.01); *G06T 2219/2004* (2013.01); *G06T 2219/2016* (2013.01); *G06T 2219/2021* (2013.01)

(58) Field of Classification Search
CPC ....... G06T 2207/10081; G06T 2210/22; G06T 2219/2004; G06T 2219/2016; G06T 2219/2021
See application file for complete search history.

(56) References Cited

U.S. PATENT DOCUMENTS

| | | | | |
|---|---|---|---|---|
| 2018/0096497 | A1* | 4/2018 | Bennett | G11B 27/031 |
| 2018/0106733 | A1* | 4/2018 | Li | G01N 23/046 |

* cited by examiner

500A

500B

THREE-DIMENSIONAL THREAT IMAGE PROJECTION AND IMAGE AUGMENTATION

CROSS-REFERENCE TO RELATED APPLICATIONS

The present application claims the benefit of the filing date of U.S. Provisional Application Ser. No. 63/584,221, filed Sep. 21, 2023, the entire teachings of which application is hereby incorporated herein by reference.

STATEMENT REGARDING FEDERALLY SPONSORED RESEARCH OR DEVELOPMENT

This invention was made with government support under 70RSAT18D00000003 awarded by the U.S. Department of Homeland Security. The government has certain rights in the invention.

TECHNICAL FIELD

The present application relates generally to security and, more particularly, to three-dimensional object image projection and image augmentation.

BACKGROUND

Three-dimensional (3D) computed tomography (CT) skid screening X-ray systems are being deployed for air cargo screening. Common types of systems currently being used by air cargo screening facilities are X-ray systems that provide two-dimensional (2D) images of a scanned item from both a top-down and side view. The Department of Homeland Security is currently enhancing its laboratory-based test and evaluation capabilities for conducting field-realistic testing of CT air cargo skid screening systems. These preparations include developing plans for conducting test and evaluation of air cargo in a safe, reliable, cost-effective, and efficient manner.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
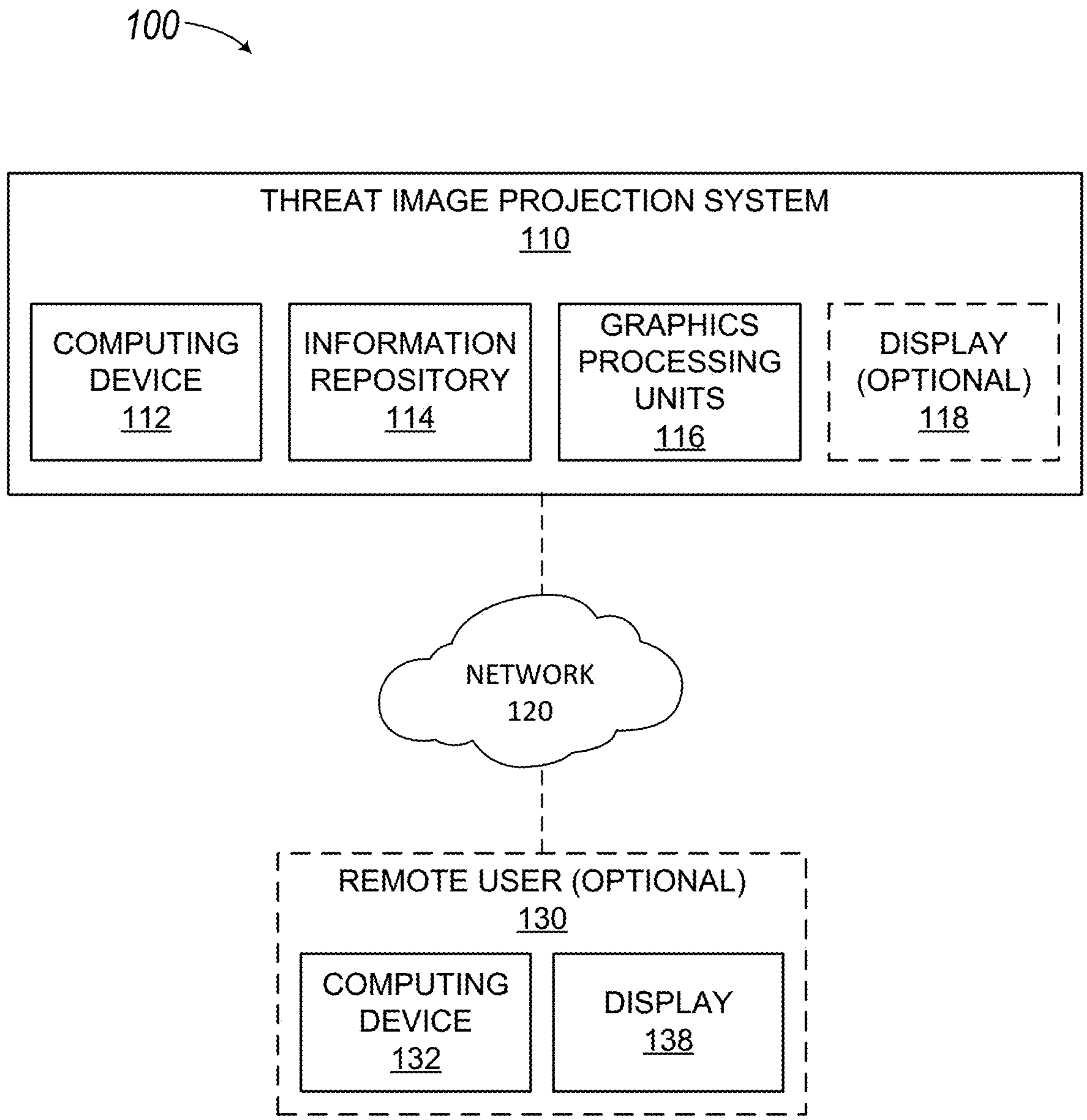
FIG. 1 is a functional block diagram illustrating a distributed data processing environment for three-dimensional object image projection and image augmentation, consistent with the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present disclosure, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

On a quarterly basis, transportation security officers (TSO) are tested on their ability to recognize, identify, and mark explosive components and other dangerous goods in airline cabin baggage and cargo. This assessment is usually performed by evaluating TSO threat detection performance on a testing playlist running on a vendor emulator or an assessment or testing platform. The trials in the testing playlist are CT scans of purposefully and expertly constructed bags or cargo. In most cases, nearly all of the bags, parcels, cargo containers, clutter, and threats have to be sourced and procured from the marketplace. A subject matter expert then constructs the bag, parcel, or cargo container in such a manner that the alarms are consistent across all TSA deployed transportation security equipment. After CT scanning the cargo, the physical materials scanned to create the playlist must be stored, in their scanned state, for a period of time for audit and protest purposes. Physical warehouses are needed to maintain this now unusable inventory.

An accurate sampling and characterization of palletized stream of commerce cargo screened by air cargo facilities is critical for designing and creating a field-realistic set of cargo skids for laboratory test and evaluation of skid screening X-ray systems. This stream of commerce sampling and characterization may include a representation of as many of the eight common Transportation Security Administration (TSA) air cargo commodities as possible to increase the validity of laboratory-based testing.

There exists a need to create virtual or synthetic 3D CT system air cargo images for test and evaluation purposes. Disclosed herein is a system and method for three-dimensional object image projection, including threat image projection (TIP), and image augmentation. The disclosed object image projection capability virtually inserts an isolated volumetric object into a separate volumetric background image. Using the disclosed system, object image data from the stream of commerce, or from another image source, and background image data can be collected separately and merged afterwards using the disclosed tools. The object image may be, for example, a threat object, such as a gun or an explosive device.

The disclosed system comprises automated target recognition detectable synthetic image data that reduces material procurement and storage costs, since threat scans may be projected into stream of commerce images or stream of commerce images can be augmented to meet the test and evaluation criteria; material sourcing delays and complications may be reduced as existing image libraries can be augmented, if necessary, and reused; test and evaluation image and playlist construction may also be accelerated as virtual construction is faster than physical construction; and existing image libraries can be reconditioned and expanded by augmenting existing images and utilizing the object image projection capability to essentially build a new object from existing images.

Registration, i.e., the mapping of a threat to a parcel, and void determination, i.e., the appropriate object image projection location determination, are important considerations to develop high-quality, realistic synthetic images. The disclosed system incorporates registration, void determination, as well as streak artifact generation to produce realistic images. Streak artifact generation may be used to simulate the dark streaking bands caused by metal objects during a CT scan.

In an embodiment, the system may include a collection of image augmentation tools. These tools may include, but are not limited to, cropping objects, masking materials, geometric transforms of the object shape, and material replacement. The crop augmentation function segments an object defined by a 3D box from the source image. The image creator uses this tool to create an individual threat or target object from an existing image, to be used as foreground image for object image projection. The cropping functionality allows for reuse of existing image libraries.

The mask augmentation creates a bitmask image in the region defined by the 3D box and within a custom range of scalar values. The image creator would use this tool to not only visualize a selected material area but also create this mask image and coordinate data for alarm manager population. The mask material function is also used with the material replacement function.

The geometric transform augmentation alters the image's shape by applying arbitrarily defined combinations of translation, rotation, scaling and skewing on the whole image volume. Using this function, a whole cargo image or a cropped object image can be altered in such a way that it appears different than the original 3D image. This allows a new cargo or object image to be created for use in playlist building.

The material replacement augmentation uses a combination of the masks produced by the mask augmentation function as well as objects produced by the crop augmentation function to overwrite masked materials with the contents of a selected cropped object. Finally, the system includes a method to statistically validate synthetic images against the X-ray system native images.

FIG. 1 is a functional block diagram illustrating a distributed data processing environment, generally designated 100, for three-dimensional object image projection and image augmentation consistent with the present disclosure. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the disclosure as recited by the claims.

Distributed data processing environment 100 includes object image projection system 110 optionally connected to network 120 and remote user 130. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between object image projection system 110, remote user 130, and other computing devices (not shown) within distributed data processing environment 100.

Object image projection system 110 may include computing device 112, information repository 114, and graphics processing units 116. Computing device 112 can be a standalone computing device, a management server, a web server, a mobile computing device, or any other electronic device or computing system capable of receiving, sending, and processing data. In an embodiment, computing device 112 can be a personal computer (PC), a desktop computer, a laptop computer, a tablet computer, a netbook computer, a smart phone, or any programmable electronic device capable of communicating with other computing devices (not shown) within distributed data processing environment 100 via network 120. In another embodiment, computing device 112 can represent a server computing system utilizing multiple computers as a server system, such as in a cloud computing environment. In yet another embodiment, computing device 112 represents a computing system utilizing clustered computers and components (e.g., database server computers, application server computers) that act as a single pool of seamless resources when accessed within distributed data processing environment 100.

In an embodiment, object image projection system 110 includes information repository 114. Information repository 114 is a data repository that can store, gather, compare, and/or combine information. In some embodiments, information repository 114 is located externally to object image projection system 110 and accessed through a communication network, such as network 120. In some embodiments, information repository 114 is stored on object image projection system 110. In some embodiments, information repository 114 may reside on another computing device (not shown), provided that information repository 114 is accessible by object image projection system 110.

In an embodiment, object image projection system 110 includes graphics processing units (GPU) 116. In an embodiment, GPU 116 may include one or more GPU integrated circuit devices. In another embodiment, GPU 116 may be one or more circuit card assemblies. In yet another embodiment, GPU 116 may be any circuitry to perform parallel processing to accelerate the projection of object images by the object image projection system 110.

In an embodiment, object image projection system 110 may also be the viewing system that handles presenting the object images to a user and may optionally include display 118. Display 118 provides a mechanism to display data to a user and may be, for example, a computer monitor.

Display 118 can also function as a touchscreen, such as a display of a tablet computer. Distributed data processing environment 100 optionally includes remote user 130. In an embodiment, remote user 130 may be a user of the object images created by the object image projection system 110, for example, a training officer at the TSA using the projected object images for training and testing of TSA agents. Remote user 130 may include computing device 132 and display 138.

Computing device 132 can be a standalone computing device, a management server, a web server, a mobile computing device, or any other electronic device or computing system capable of receiving, sending, and processing data. In an embodiment, computing device 132 can be a personal computer (PC), a desktop computer, a laptop computer, a tablet computer, a netbook computer, a smart phone, or any programmable electronic device capable of communicating with other computing devices (not shown) within distributed data processing environment 100 via network 120. In another embodiment, computing device 132 can represent a server computing system utilizing multiple computers as a server system, such as in a cloud computing environment. In yet another embodiment, computing device 132 represents a computing system utilizing clustered computers and components (e.g., database server computers, application server computers) that act as a single pool of seamless resources when accessed within distributed data processing environment 100.

Display 138 provides a mechanism to display data to a user and may be, for example, a computer monitor. Display 138 can also function as a touchscreen, such as a display of a tablet computer.

Figure 2A:
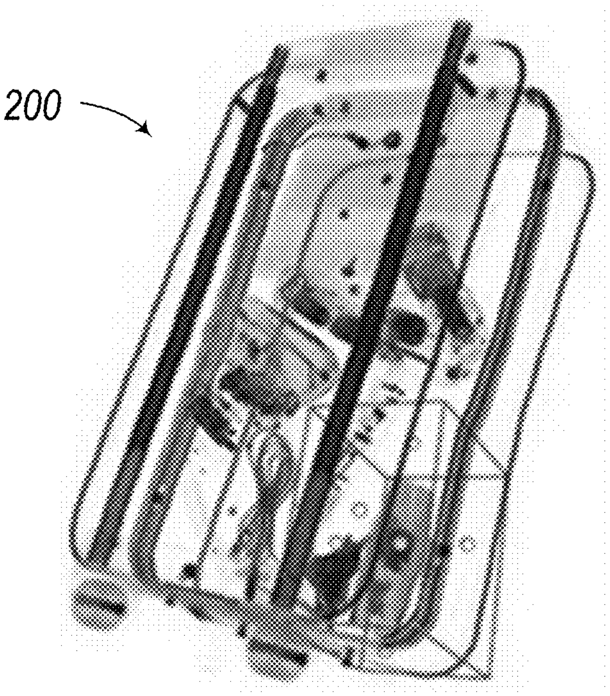
FIGS. 2A and 2B are examples of volumetric images generated by the system of FIG. 1, consistent with the present disclosure.
Figure 2B:
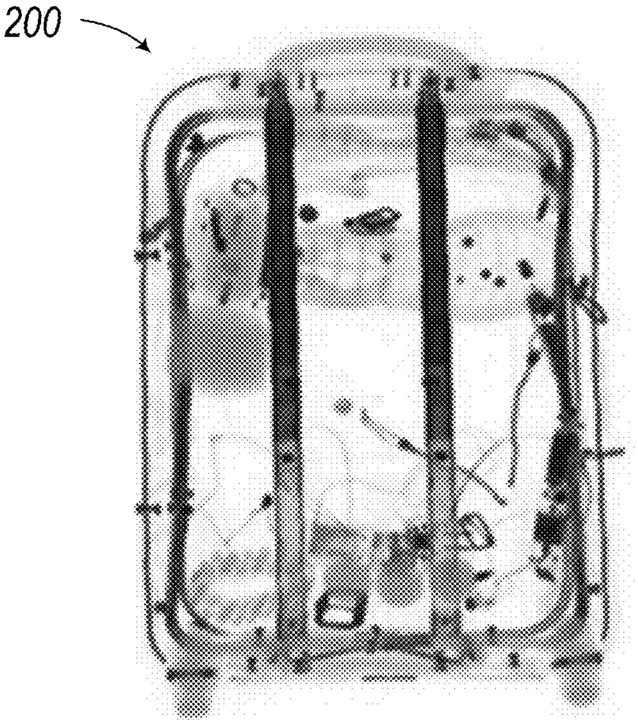

FIGS. 2A and 2B are examples of volumetric images generated by the system of FIG. 1, consistent with the present disclosure. FIG. 2A is a perspective view of bag 200 as generated by the object image projection system of FIG. 1. FIG. 2B is a front view of the same bag 200. The examples of FIGS. 2A and 2B illustrate a 3D image of the bag 200 and the contents as would be seen on the screen of an actual CT scanner used for threat detection, e.g., by TSA officers at an airport.

Figure 3A:
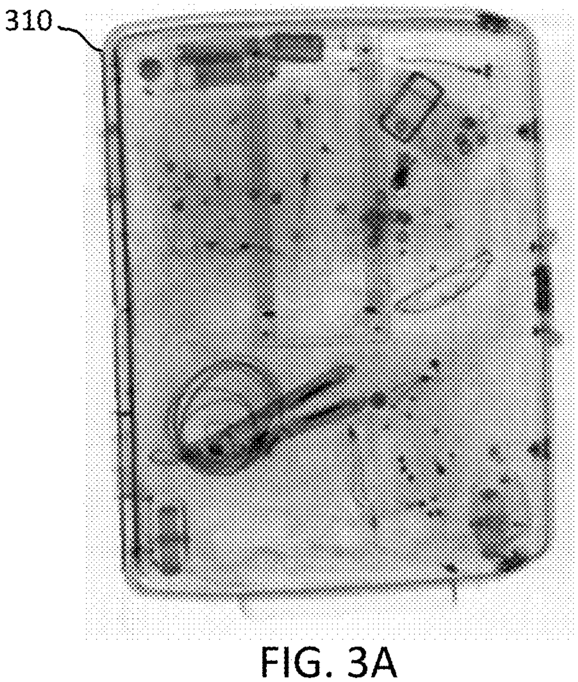
FIGS. 3A, 3B, 3C and 3D are examples of the generation of a composite volumetric image, on the distributed data processing environment of FIG. 1, consistent with the present disclosure.
Figure 3B:
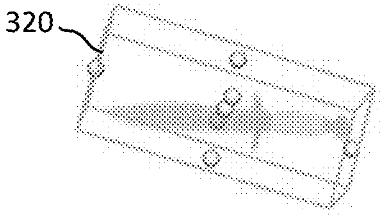
Figure 3C:
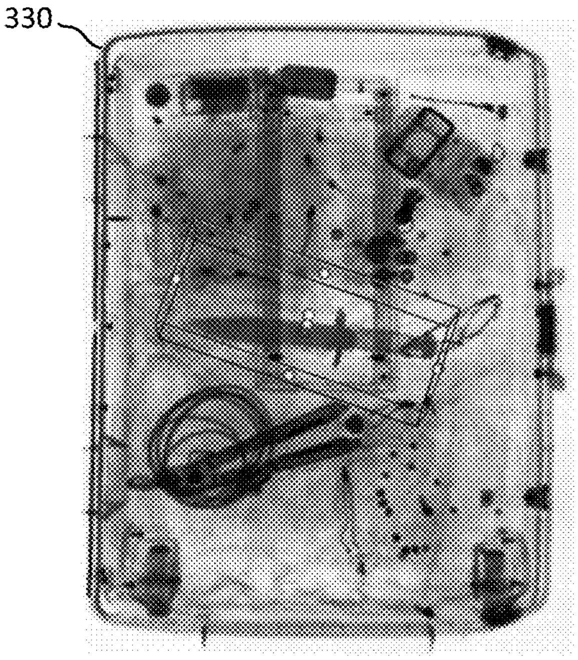
Figure 3D:
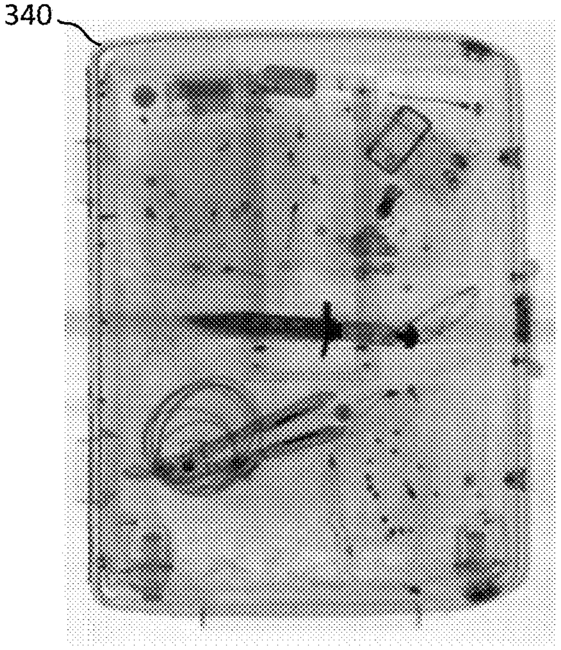

FIGS. 3A, 3B, 3C and 3D are examples of the generation of a composite volumetric image, on the distributed data processing environment of FIG. 1, consistent with the present disclosure. FIG. 3A is an example of a background image 310, e.g., a bag or suitcase, with a variety of items placed in the background image 310. FIG. 3B is an example of an object image 320 that the user, e.g., a TSA training officer, wants to insert into the background image 310 for training or testing purposes. FIG. 3C is an example of the background image 310 with the object image 320 inserted into the background image 310 by the object image projection system 110, and FIG. 3D is the realistic synthetic image 340 after image augmentation.

Figure 4:
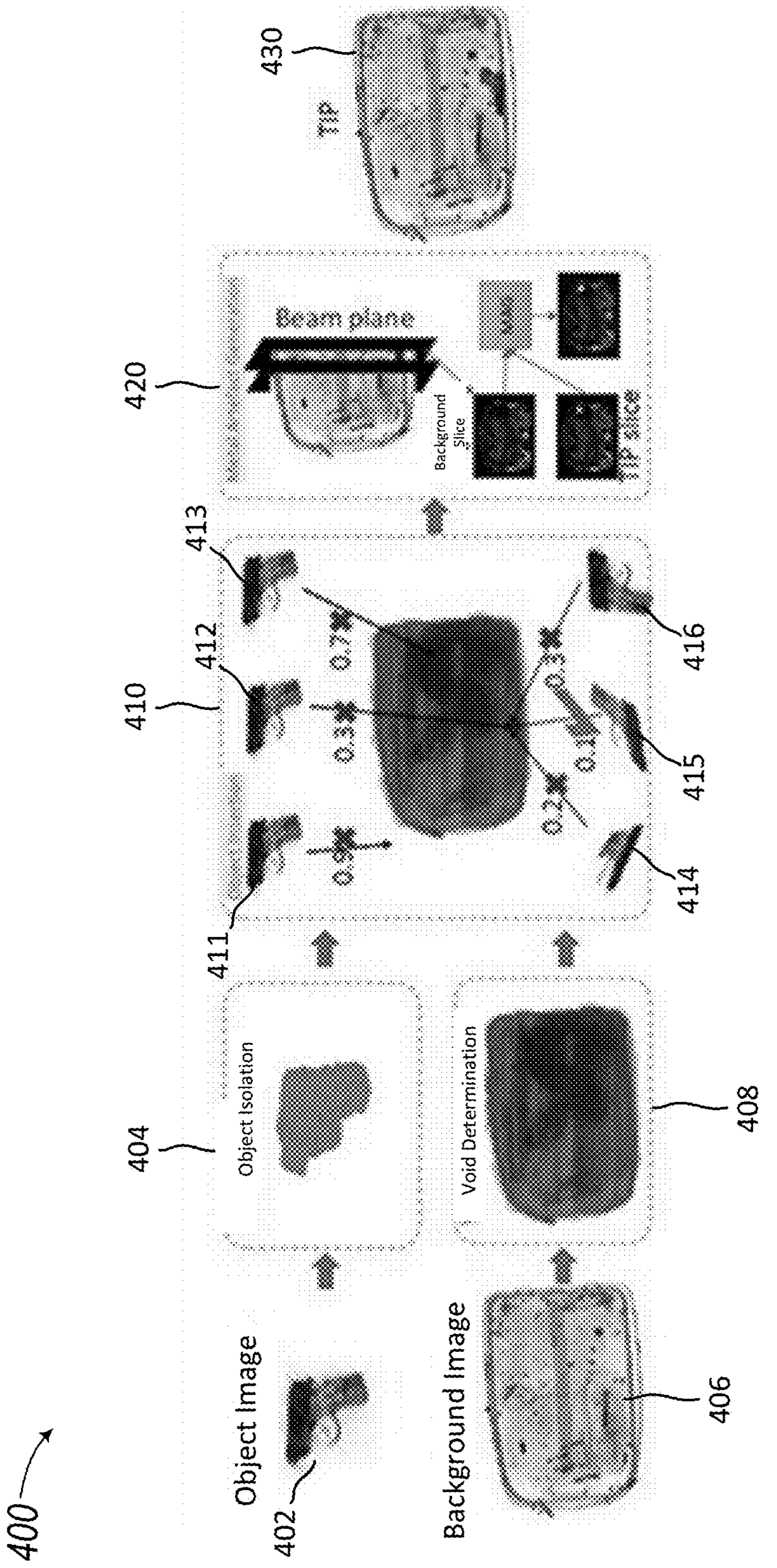
FIG. 4 is an illustrative example of the process of 3D object image projection to virtually insert an isolated volumetric object into a volumetric background image, consistent with the present disclosure.

FIG. 4 is an illustrative example of the process of 3D object image projection to virtually insert an isolated volumetric object into a volumetric background image, including image augmentation. The 3D synthetic images may be generated by one of two possible approaches. In one embodiment, the first approach uses a 3D object image projection blending algorithm to virtually insert an isolated volumetric object into a separate volumetric background image to create a projected object image. This embodiment allows the object image data (in either low clutter backgrounds or in an entire parcel) and the benign stream of commerce background image data to be collected separately and merged afterwards on the disclosed system. Optimizing such a 3D blending program requires certain key considerations, such as proper mapping of threat to parcel (registration), void determination where to insert the threat object, and as appropriate, streak artifact generations to produce realistic images.

In another embodiment, the second data augmentation approach involves directly manually manipulating selected, segmented volumetric objects within an original raw image data file. In this embodiment, threat-containing image data is collected or provided for further image processing to include affine and elastic transformation of pixel values. Input images are expected to be in standard format such as Digital Imaging and Communication in Security (DICOS) format or the system will convert the files based on a given prototype CT skid screening system's original image file format. The newly generated images are then saved into a library.

Thresholding and region growing methods may be applied to the background image 406 to identify the optimum void space for inserting a foreign object, as necessary. For instance, threshold the background image 406 using CT value selected for the specific machine such that air is removed. In an embodiment, the predetermined level may be a value selected by a user.

In the example of FIG. 4, an object image 402, in this example a gun, is to be inserted into a background image 406, in this example a bag. First, the threat in object image 402 is isolated in operation 404. In the example of FIG. 4, the object image 402 contains only the actual threat, i.e., a gun, but in other examples the object image 402 may include other objects, requiring the threat to be isolated in operation 404. In operation 408, voids are determined in the background image 406 that have sufficient volume and dimensions to incorporate the object image 402 once it has been isolated in operation 404.

In operation 410, the isolated object image 402 is manipulated to insert the object image 402 into an appropriate void in the background image 406. Manipulated images 411, 412, 413, 414, 415, and 416 illustrate various manipulations, such as rotations, that may be used to fit the object image 402 into an appropriate void in the background image 406. In the example of FIG. 4, manipulated image 415 is selected as the best fit based on the available voids. In operation 420, streak artifact generation may be used to produce realistic images. These operations result in projected image 430.

To validate a new, augmented image library, two methods may be employed. In one embodiment, the first approach, typically used for data augmentation, consists of ensuring the format of the new images are compatible with a vendor's prototype CT skid screening system emulator. New images possessing manual data augmentations may be accepted if they can be read in, displayed, and manipulated via any standard operator facing controls (e.g., rotation, zoom in/out) by the emulator without error, in the same way native images are read and displayed. Additionally, the newly augmented images may be accepted if they can also be processed on the emulator with a vendor's developmental automated target recognition algorithm the same way the native images would be processed with automated target recognition.

In another embodiment, the second approach may be based on an actual visual assessment of the synthetic images by a human operator. In this approach, mostly suitable for the 3D object image projection, a new image will be considered acceptable if the injected threat signature is properly inserted into a void region within the benign cargo volume and appears visually realistic and plausible, as assessed by a reviewer. A volume may be labeled as deficient if it is obviously unrealistic, for example, the threat signature is inserted outside the cargo volume, is intercepted by other items, or contradicts physical intuition. An image volume of medium quality may be acceptable but not perfect if the flaw can be spotted by careful inspection after a considerable time, e.g., greater than 5 minutes.

Figure 5A:
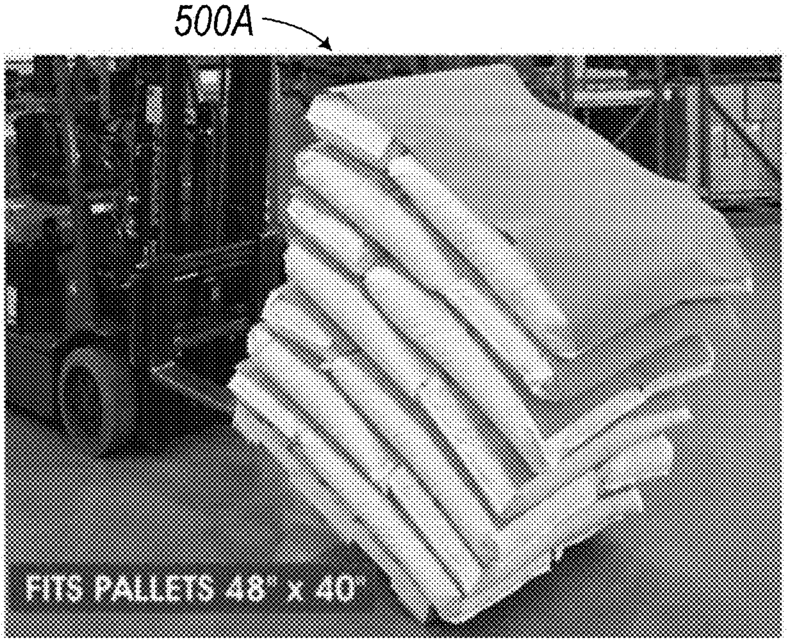
FIGS. 5A and 5B are examples of cargo pallets that may be virtually constructed using the disclosed system, consistent with the present disclosure.
Figure 5B:

FIGS. 5A and 5B are examples of cargo pallets that may be scanned to produce background images for use in the disclosed system, consistent with the present disclosure. FIG. 5A shows bulk pallet 500A, which is a pallet loaded with bulk items, e.g., bags of powered material. FIG. 5B shows a stacked pallet 500B, which is a pallet loaded with packaged items. Stacked pallet 5B may contain, for example, individual boxes of cargo items, or boxes that each contain a plurality of cargo items.

Figure 6:
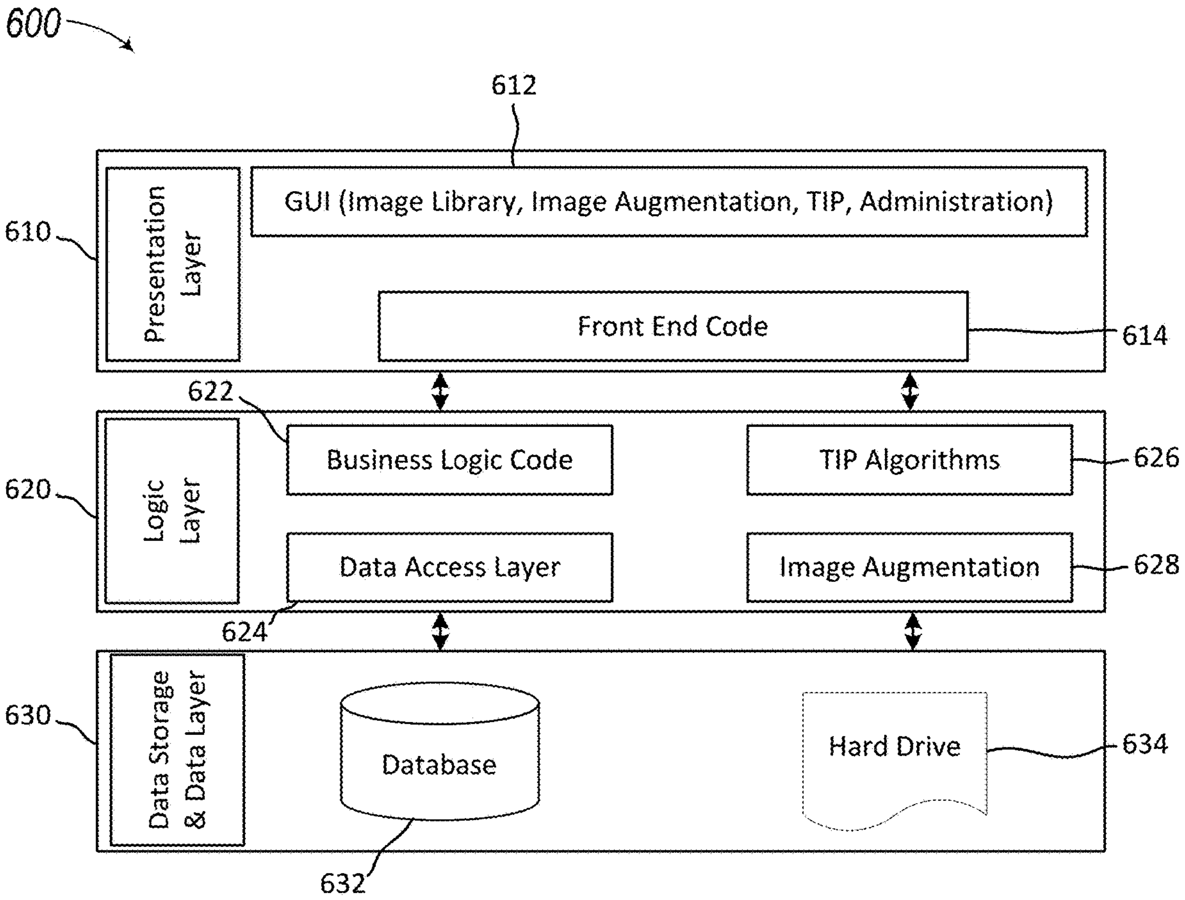
FIG. 6 is a block diagram of one possible software architecture for 3D object image projection and image augmentation, consistent with the present disclosure.

FIG. 6 is a block diagram of one possible software architecture for 3D object image projection and image augmentation, consistent with the present disclosure. The disclosed system may be a multilayer application composed of logically structured, conceptually separated presentation layer 610, domain logic layer 620, and data storage layer 630. The presentation layer 610 is the topmost layer of the application and is the only layer accessible to the user. The presentation layer 610 includes the GUI 612, which may display, but is not limited to, the image library, image augmentation, the projected images, and administration functions. The presentation layer 610 also includes the front end code 614 to interface the GUI 612 with the underlying system code. This user interface layer displays information retrieved and processed on the other solution layers. The presentation layer shows the user the logical, scientific, and business operations and information in a user-friendly format.

The domain logic layer 620 contains the scientific and business functionality. For modularity supporting development and maintenance, the domain logic layer 620 is pulled from the presentation layer. In addition to the business logic code 622 and processing controlling the presentation and data layer access 624, the domain logic layer 620 may also include, but is not limited to, the object image projection algorithms 626 and image augmentation 628 component. These components are independent of the main application and may be accessed or initiated through their respective application programming interface or run inside its respective process.

The data storage layer 630 encompasses both a file system and a database 632. In an embodiment, the database 632 may be a relational database. Image data files may be stored and retrieved for several purposes by the application, such as object image projection, augmentation, or viewing the image details. The system may store cargo and object images on, for example, hard drive 634. Additionally, as new images are created through object image projection and augmentation, these images are also stored on hard drive 634. In an embodiment, hard drive 634 and database 632 may be included in information repository 114 from FIG. 1.

The links or paths to these images are stored in the database 632, which the application queries to retrieve, among many other things, the filesystem paths to these images. The database also stores all word-based data, and, in some cases, binary data. The database 632 may be composed of data tables designed to capture and report information entered through the GUI 612 or generated by the object image projection and image augmentation. Every data table may be indexed for optimal performance. As necessary, relationships between data tables may be created for optimal and accurate querying.

The image format used to represent the volume will depend on the CT system vendor and its respective image file type(s). Some CT system vendors use the DICOS standard their image files. The DICOS format allows for aggregation of contextual metadata, such as the time and date of the scan and an identification number or code unique to the scan event associated with the image. The volume is segmented into individual 2D slices with a depth of one voxel each. The number of slices may be equal to one of the volume's extents. Each slice is then represented as a 2D image with a width and height equal to the volume's other two extents.

Figure 7:
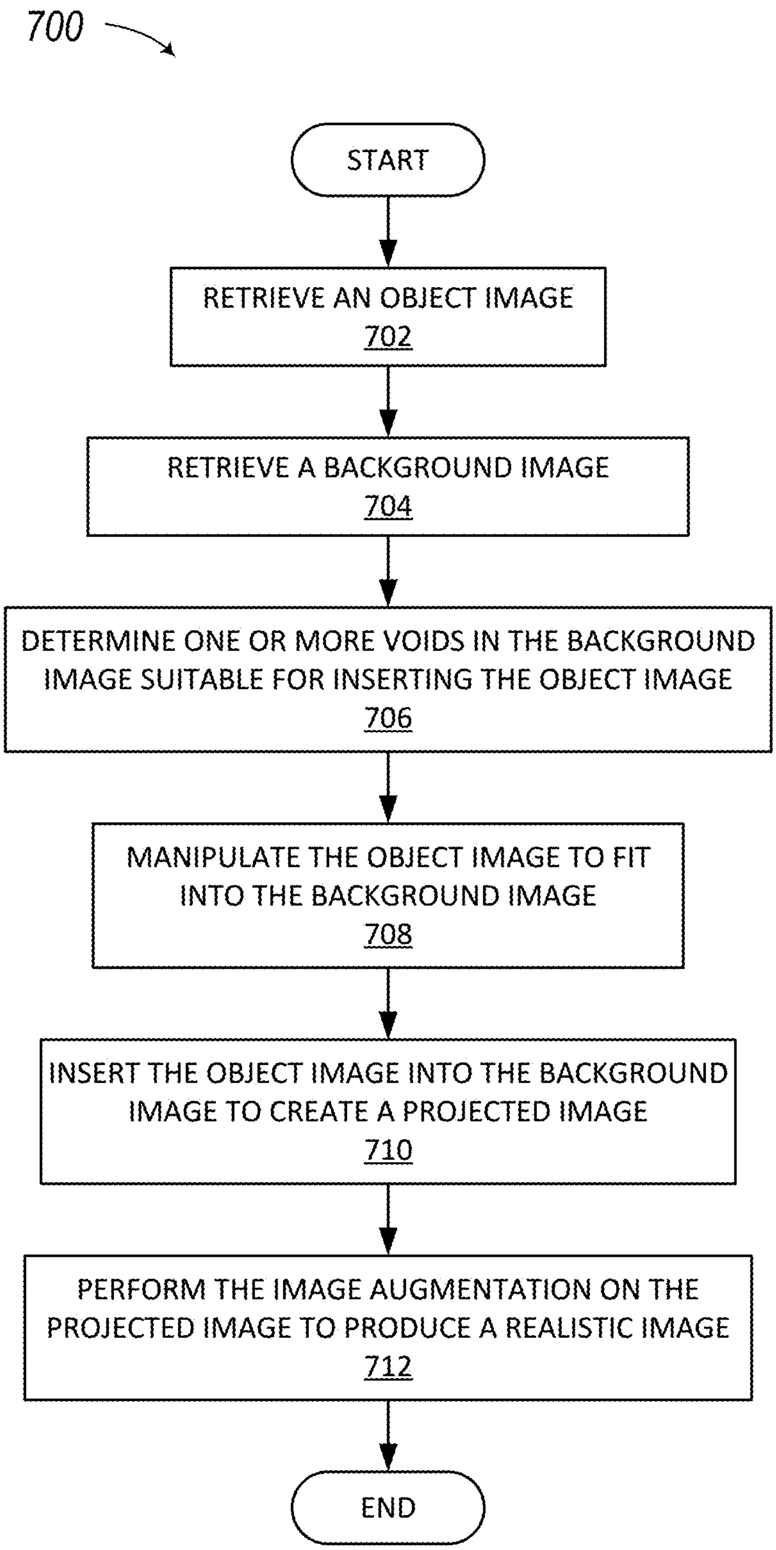
FIG. 7 is a flowchart diagram depicting the process for one example embodiment for three-dimensional object image projection and image augmentation, consistent with the present disclosure.

FIG. 7 is a flowchart diagram 700 depicting the process for one example embodiment for three-dimensional object image projection and image augmentation, consistent with the present disclosure. It should be appreciated that FIG. 7 provides only an illustration of one implementation and does not imply any limitations with regard to the environments in which different embodiments may be implemented. Many modifications to the depicted environment may be made by those skilled in the art without departing from the scope of the disclosure as recited by the claims.

Process includes retrieving an object image (operation 702). In the illustrated example embodiment, an object image is retrieved, for example, from a database, such as database 632 from FIG. 6, or a data storage device, such as hard drive 634 of FIG. 6, of object images. In an embodiment, the object image may be extracted from a source image that may contain other objects in addition to the selected object. In these embodiments, once the desired object is selected, it is isolated from the other objects and extracted from the original image.

Process includes retrieving a background image (operation 704). In operation 704, a background image is retrieved, for example, from a database, such as database 632 from FIG. 6, or a data storage device, such as hard drive 634 of FIG. 6, of background images. A background image may include, but is not limited to, low clutter backgrounds, an entire parcel, a bulk container, a pallet, and/or a benign stream of commerce background image.

Process includes determining one or more voids in the background image suitable for inserting the object image (operation 706). In operation 706, voids are determined in the background image that have sufficient volume and dimensions to incorporate the object image once it has been isolated in operation 704.

Process includes manipulating the object image to fit into the background image (operation 708). In operation 708, the object image may be manipulated to fit into a void in the background image. In an embodiment, these manipulations may include applying arbitrarily defined combinations of translation, rotation, scaling and skewing. In another embodiment, the manipulations may include affine transformation and/or elastic transformation of pixel values.

Process includes inserting the object image into the background image to create a projected image (operation 710). In operation 710, once the object image has been manipulated to fit into the selected void in the background image, the object image is inserted into the selected void in the background image to create a projected image.

Process includes performing the image augmentation on the projected image to produce a realistic image (operation 712). In operation 712, the projected image may be augmented by, for example, streak artifact generation to produce a realistic synthetic image. In an embodiment, the synthetic image may be sent to a user, for example, a TSA trainer, or may be stored in a database, such as database 632 from FIG.

6, or a data storage device, such as hard drive 634 of FIG. 6. The process then ends for this image.

Figure 8:
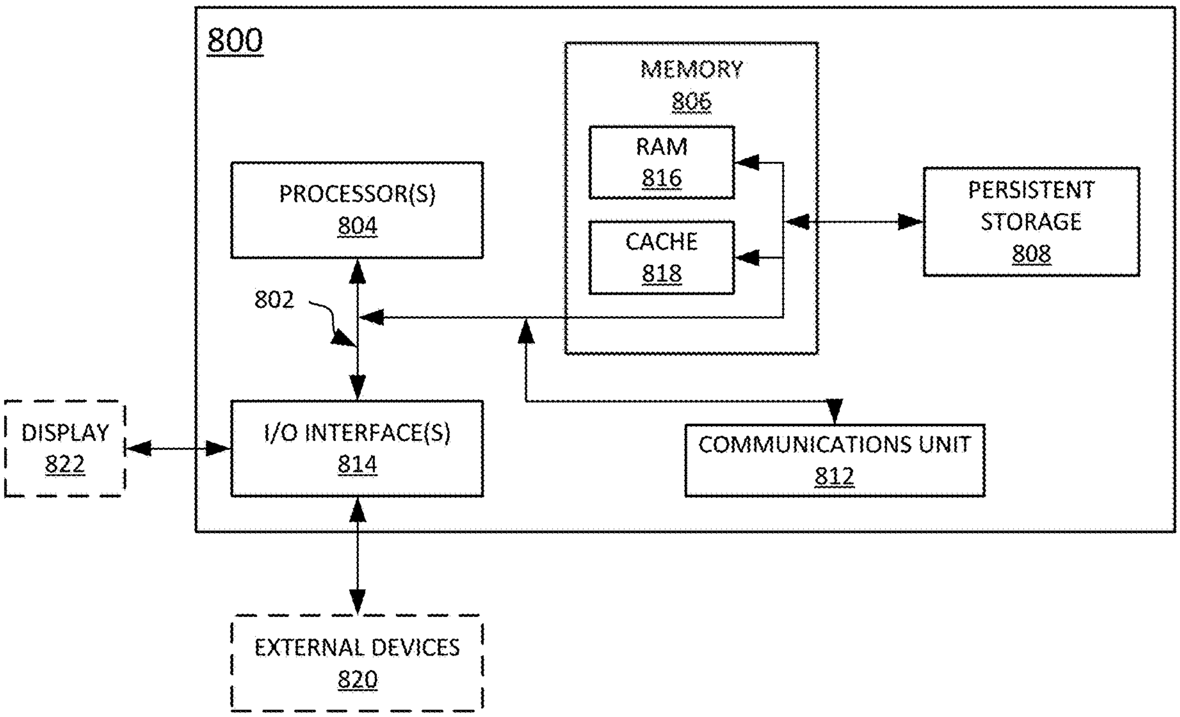
FIG. 8 depicts a block diagram of components of the computing device for 3D object image projection and image augmentation within the distributed data processing environment of FIG. 1, consistent with the present disclosure.

FIG. 8 depicts a block diagram of components of the computing device for 3D object image projection and image augmentation within the distributed data processing environment of FIG. 1, consistent with the present disclosure. FIG. 8 displays the computing device or computer 800, one or more processor(s) 804 (including one or more computer processors), a communications fabric 802, a memory 806 including, a random-access memory (RAM) 816 and a cache 818, a persistent storage 808, a communications unit 812, I/O interfaces 814, a display 822, and external devices 820. It should be appreciated that FIG. 8 provides only an illustration of one embodiment and does not imply any limitations with regard to the environments in which different embodiments may be implemented. Many modifications to the depicted environment may be made.

As depicted, the computer 800 operates over the communications fabric 802, which provides communications between the computer processor(s) 804, memory 806, persistent storage 808, communications unit 812, and input/output (I/O) interface(s) 814. The communications fabric 802 may be implemented with an architecture suitable for passing data or control information between the processors 804 (e.g., microprocessors, communications processors, and network processors), the memory 806, the external devices 820, and any other hardware components within a system. For example, the communications fabric 802 may be implemented with one or more buses.

The memory 806 and persistent storage 808 are computer readable storage media. In the depicted embodiment, the memory 806 comprises a RAM 816 and a cache 818. In general, the memory 806 can include any suitable volatile or non-volatile computer readable storage media. Cache 818 is a fast memory that enhances the performance of processor(s) 804 by holding recently accessed data, and near recently accessed data, from RAM 816.

Program instructions for 3D object image projection and image augmentation may be stored in the persistent storage 808, or more generally, any computer readable storage media, for execution by one or more of the respective computer processors 804 via one or more memories of the memory 806. The persistent storage 808 may be a magnetic hard disk drive, a solid-state disk drive, a semiconductor storage device, flash memory, read only memory (ROM), electronically erasable programmable read-only memory (EEPROM), or any other computer readable storage media that is capable of storing program instruction or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

The communications unit 812, in these examples, provides for communications with other data processing systems or devices. In these examples, the communications unit 812 includes one or more network interface cards. The communications unit 812 may provide communications through the use of either or both physical and wireless communications links. In the context of some embodiments of the present disclosure, the source of the various input data may be physically remote to the computer 800 such that the input data may be received, and the output similarly transmitted via the communications unit 812.

The I/O interface(s) 814 allows for input and output of data with other devices that may be connected to computer 800. For example, the I/O interface(s) 814 may provide a connection to external device(s) 820 such as a keyboard, a keypad, a touch screen, a microphone, a digital camera, and/or some other suitable input device. External device(s) 820 can also include portable computer readable storage media such as, for example, thumb drives, portable optical or magnetic disks, and memory cards. Software and data used to practice embodiments of the present disclosure, e.g., 3D object image projection and image augmentation, can be stored on such portable computer readable storage media and can be loaded onto persistent storage 808 via the I/O interface(s) 814. I/O interface(s) 814 also connect to a display 822.

Display 822 provides a mechanism to display data to a user and may be, for example, a computer monitor. Display 822 can also function as a touchscreen, such as a display of a tablet computer.

According to one aspect of the disclosure there is thus provided a system for three-dimensional object image projection and image augmentation, the system including: one or more computer processors; one or more graphics processing units; one or more computer readable storage media; and program instructions stored on the one or more computer readable storage media for execution by at least one of the one or more computer processors. The stored program instructions including instructions to: retrieve an object image; retrieve a background image; determine one or more voids in the background image suitable for inserting the object image; manipulate the object image to fit into the background image; insert the object image into the background image to create a projected image; and perform the image augmentation on the projected image to produce a realistic synthetic image.

According to another aspect of the disclosure there is thus provided a method for three-dimensional object image projection and image augmentation, the method including: retrieving an object image; retrieving a background image; determining one or more voids in the background image suitable for inserting the object image; manipulating the object image to fit into the background image and to produce a realistic image; and inserting the object image into the background image to create a projected image.

According to yet another aspect of the disclosure there is thus provided a system for three-dimensional object image projection and image augmentation, the system including: one or more graphics processing units, the one or more graphics processing units configured to: retrieve an object image; retrieve a background image; determine one or more voids in the background image suitable for inserting the object image; manipulate the object image to fit into the background image; insert the object image into the background image to create a projected image; and perform the image augmentation on the projected image to produce a realistic image.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

"Circuitry," as used in any embodiment herein, may comprise, for example, singly or in any combination, hard-wired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product. The system or computer program product may include one or more non-transitory computer readable storage media having computer readable program instructions thereon for causing a processor to carry out aspects of the present disclosure.

The one or more non-transitory computer readable storage media can be any tangible device that can retain and store instructions for use by an instruction execution device. The one or more non-transitory computer readable storage media may be, for example, but is not limited to, an electronic storage device, a magnetic storage device, an optical storage device, an electromagnetic storage device, a semiconductor storage device, or any suitable combination of the foregoing. A non-transitory computer readable storage media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from one or more non-transitory computer readable storage media or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in one or more non-transitory computer readable storage media within the respective computing/processing device.

Computer readable program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or other Programmable Logic Devices (PLD) may execute the computer readable program instructions by utilizing state information of the computer readable program instructions to personalize the electronic circuitry, in order to perform aspects of the present disclosure.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A system for three-dimensional object image projection and image augmentation, the system comprising:
- one or more computer processors;
- one or more graphics processing units;
- one or more computer readable storage media; and
- program instructions stored on the one or more computer readable storage media for execution by at least one of the one or more computer processors or at least one of the one or more graphics processing units, the stored program instructions including instructions to:
  - retrieve an object image;
  - retrieve a background image;
  - segment an object defined by a first three-dimensional box from the object image;
  - create a bitmask image in a region defined by a second three-dimensional box to visualize a selected material area;
  - determine one or more voids in the background image suitable for inserting the object image;
  - manipulate the object image to fit into the background image;
  - insert the object image into the background image to create a projected image; and
  - perform the image augmentation on the projected image to produce a realistic synthetic image wherein the image augmentation overwrites one or more materials in the bitmask image with one or more contents of the selected material area.

2. The system of claim 1, wherein the object image and the background image are retrieved from a database.

3. The system of claim 1, wherein retrieve the object image further comprises:
- select the object image from a source image;
- isolate the object image from other objects in source image; and
- extract the object image from the source image.

4. The system of claim 1, wherein determine the one or more voids in the background image suitable for inserting the object image further comprises:
- threshold the background image using a computed tomography (CT) value above a predetermined level to remove air.

5. The system of claim 1, wherein manipulate the object image to fit into the background image further comprises:
- manipulate the object image using any standard operator facing controls, wherein the standard operator facing controls include at least one of a rotation, a zoom in, or a zoom out.

6. The system of claim 1, wherein the image augmentation includes at least one of cropping objects, masking materials, geometric transforms of an object shape, and material replacement.

7. The system of claim 1, wherein object image projection and the image augmentation is performed by the one or more graphics processing units.

8. The system of claim 1, further comprising:
- statistically validate the realistic synthetic image against an X-ray system native image.

9. The system of claim 1, further comprising:
- sending the realistic synthetic image to a user.

10. A method for three-dimensional object image projection and image augmentation, the method comprising:
- retrieving an object image;
- retrieving a background image;
- segmenting an object defined by a first three-dimensional box from the object image;
- creating a bitmask image in a region defined by a second three-dimensional box to visualize a selected material area;
- determining one or more voids in the background image suitable for inserting the object image;
- manipulating the object image to fit into the background image and to produce a realistic image;
- inserting the object image into the background image to create a projected image; and
- performing the image augmentation on the projected image, wherein the image augmentation overwrites one or more materials in the bitmask image with one or more contents of the selected material area.

11. The method of claim 10, wherein the object image and the background image are retrieved from a database.

12. The method of claim 10, wherein retrieving the object image further comprises:
- selecting the object image from a source image;
- isolating the object image from other objects in source image; and
- extracting the object image from the source image.

13. The method of claim 10, wherein determining the one or more voids in the background image suitable for inserting the object image further comprises:
- threshold the background image using a computed tomography (CT) value above a predetermined level to remove air.

14. The method of claim 10, wherein manipulate the object image to fit into the background image further comprises:
- manipulate the object image using standard operator facing controls, wherein the standard operator facing controls include at least one of a rotation, a zoom in, or a zoom out.

15. The method of claim 10, wherein the image augmentation includes at least one of cropping objects, masking materials, geometric transforms of an object shape, and material replacement.

16. The method of claim 10, further comprising:
- validating the realistic image statistically against an X-ray system native image.

17. A system for three-dimensional object image projection and image augmentation, the system comprising:
- one or more graphics processing units, the one or more graphics processing units configured to:

retrieve an object image;

retrieve a background image;

segment an object defined by a first three-dimensional box from the object image;

create a bitmask image in a region defined by a second three-dimensional box to visualize a selected material area;

determine one or more voids in the background image suitable for inserting the object image;

manipulate the object image to fit into the background image;

insert the object image into the background image to create a projected image; and perform the image augmentation on the projected image to produce a realistic image, wherein the image augmentation overwrites one or more materials in the bitmask image with one or more contents of the selected material area.

18. The system of claim 17, wherein retrieve the object image further comprises:

select the object image from a source image;

isolate the object image from other objects in source image; and extract the object image from the source image.

19. The system of claim 17, wherein determine the one or more voids in the background image suitable for inserting the object image further comprises:

threshold the background image using a computed tomography (CT) value above a predetermined level to remove air.

20. The system of claim 17, wherein the image augmentation includes at least one of cropping objects, masking materials, geometric transforms of an object shape, and material replacement.

* * * * *